July 24, 1951 — W. A. SHERBROOKE — 2,561,540
CONDUIT AND RETAINING MEANS
Filed June 16, 1948
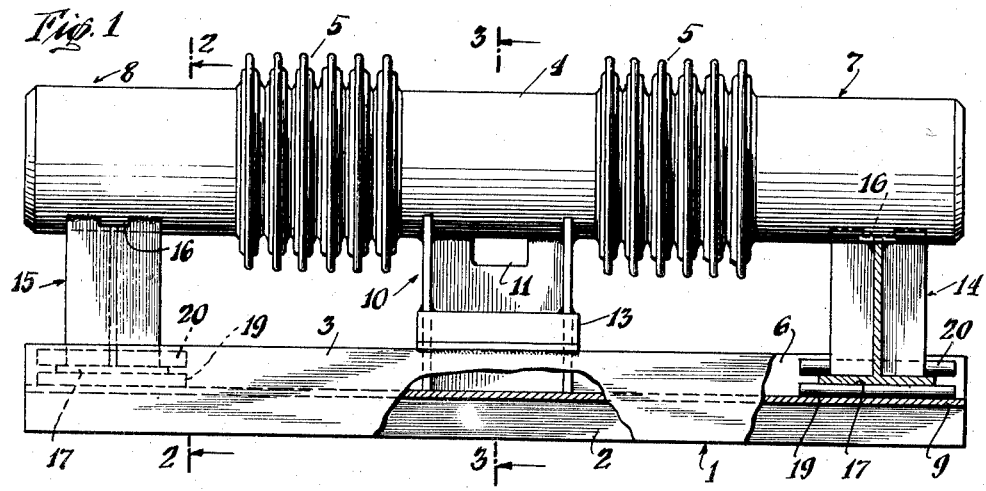
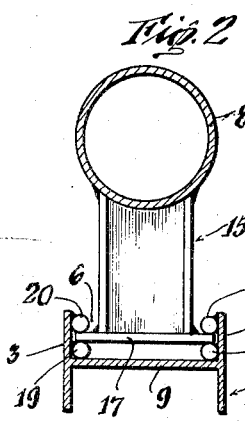
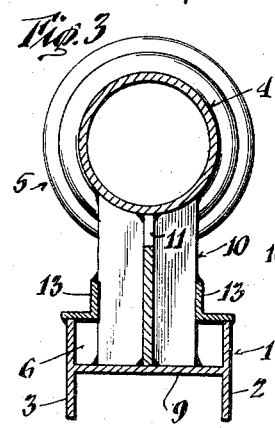
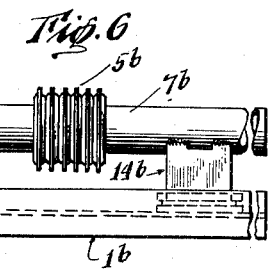
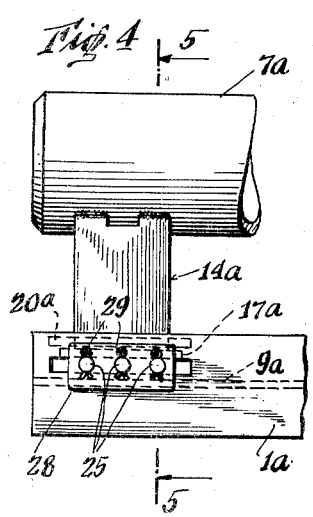
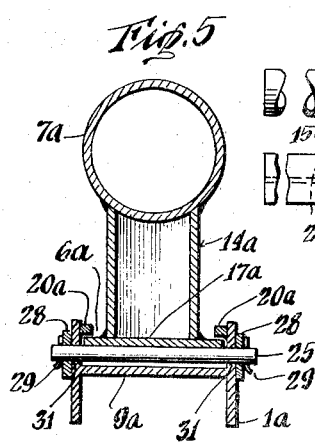
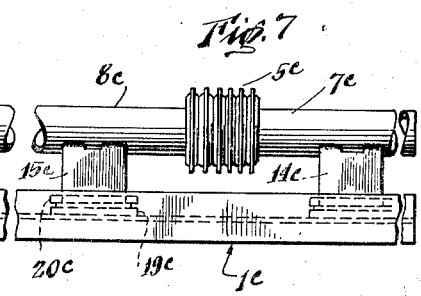
INVENTOR.
Walter A. Sherbrooke
BY
Dudley W. King
ATTORNEY Patented July 24, 1951

2,561,540

UNITED STATES PATENT OFFICE 2,561,540

CONDUIT AND RETAINING MEANS

Walter A. Sherbrooke, Great Kills, N. Y., assignor to Piping Specialties, Inc., New York, N. Y., a corporation of New York Application June 16, 1948, Serial No. 33,397

9 Claims. (Cl. 248—49)

The present invention relates to the retaining of conduits or piping and more particularly to means for maintaining conduits or piping in a definite relationship but in flexible or movable manner.

In the construction of steam power plants, for example, various fluid conducting conduits or pipes are erected while at room temperature, at which temperatures the conduits have certain lengths. When fluids of different temperature subsequently pass through the conduits, the conduits change in length and also tend to shift their positions in a more or less lateral direction. Usually the major changes in length and positions occur at the time the power plant is first put into operation, when the piping is brought from a "cold" to a "hot" position, although similar changes occur in instances where a power plant may be shut down (thus going from "hot" to "cold" position) and later started up again. Additional piping movements or shiftings may occur under the influence of shocks and jars such as are caused by earthquakes. The change in length of the piping is particularly appreciable with the elevated temperatures utilized in modern power plants.

Provision must be made for accommodating such changes in conduit dimensions, and for accommodating longitudinal movement of the piping, in order that failure or fracture of the conduits not occur. Any such failure with the comparatively high temperatures and pressures used in modern power plants might well prove disastrous. Various expedients have been adopted in order to allow movement of pipe lines under conditions such as those above referred to, but they have generally been lacking in some important respect or the other. For example, some previous expedients have been too complicated for general commercial adoption and usage, other expedients have not maintained desired piping alignments, and still others have involved objectionable erection or fabrication difficulties.

The present invention aims to overcome the above and other difficulties or disadvantages by providing a new and improved combination conduit and retaining means which is relatively simple and inexpensive to manufacture and which may be readily erected or installed. The invention further contemplates the provision of conduit supporting and retaining means which provides for conduit shifting or movement and yet which maintains the conduit in desired alignment.

An object of the present invention is to provide a new and improved combination conduit and retaining means.

Another object of the invention is to provide a new and improved conduit supporting means.

Another object of the invention is to provide a new and improved conduit guiding means.

Another object is to provide conduit supporting and guiding means which may be erected as a unit.

Still another object of the invention is to provide new and improved means for accommodating expansion and contraction of a conduit and for maintaining the conduit portions in alignment during such expansion and contraction movements.

A still further object of the invention is to provide an improved conduit retaining construction which is relatively simple and inexpensive to manufacture.

Other and further objects of the invention will be obvious upon an understanding of the illustrative embodiments about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings,

Fig. 1 is a side elevational view, partly broken away, illustrating one form of the present invention;

Fig. 2 is a sectional view taken along the line 2—2 of Fig. 1;

Fig. 3 is a sectional view taken along the line 3—3 of Fig. 1;

Fig. 4 is a fragmentary side elevational view, illustrating a modified form of the embodiment shown in Figs. 1, 2 and 3;

Fig. 5 is a sectional view taken along the line 5—5 of Fig. 4;

Fig. 6 is a fragmentary side elevational view showing another form of the invention illustrated in Fig. 1; and Fig. 7 is a fragmentary side elevational view illustrating a further form of the invention illustrated in Fig. 1.

The device of the present invention may be used at any desired location and in any desired position in a power plant, processing plant, et cetera. For purposes of clarity and convenience in illustration and description it will be shown and described chiefly with reference to its utilization in a horizontal position.

Referring more particularly to Figs. 1, 2 and 3 of the drawings there is shown a portion of a conduit or pipe line comprising one conduit portion 4 connected or joined by suitable expansion-contraction accommodating means 5 with additional outwardly disposed conduit portions 7 and 8. The particular expansion-contraction accommodating means 5 illustrated is of the corrugated or flexible bellows type, opposite ends of the bellows being joined with the conduits 4, 7 and 8 by welding or in any other suitable manner. As outwardly disposed conduit portions 7 and 8, and other conduit or piping connected therewith, expand or contract in a longitudinal direction the folds or corrugations of the bellows members 5 move together or apart, depending upon the direction of movement of the various conduits. The inner ends of the bellows type expansion means 5 connect with a fixedly secured or "anchored" central conduit portion 4. The present invention is not limited to the use of a flexible bellows or corrugated type expansion-contraction accommodating means as other types, such as the slip type expansion joint, may be utilized.

The conduits 4, 7 and 5 may be of any suitable diameters and lengths and the outer ends of the movable conduit portions 7 and 8 may be beveled or inclined to facilitate welding or attachment of them with the ends of relatively long pieces of pipe or conduit (not shown).

The centrally disposed conduit portion 4 is fixedly secured in position by welding, bolting or otherwise to a supporting leg or member 10 adjacent the upper part thereof, the lower end or portion of the supporting leg 10 being welded or otherwise fixedly secured in position on a base or foundation member 1. The base member 1 is preferably of substantially H-shape or channel shaped cross section and the lower end of the anchored supporting leg 10 extends inwardly to a channel 6 between upwardly projecting flanges of the base member 1 (Fig. 3).

The supporting leg 10 may comprise any suitable wide flange beam, channel or plate section, the upper portion thereof being cut away to accommodate the underside of the conduit 4 which is preferably welded thereto. The central portion of the anchored supporting member 10 is preferably cut away or recessed at 11 so that in fabrication the welder is obliged to interrupt the weld rather than to weld entirely across the length of the web; this minimizes the possibility of creating objectionable stresses or strains and possibly weakening the conduit portion 4. Angle members 13 may be welded to the flanges of the base member 1 and to the upwardly extending leg member 10 to provide increased strength and retention together of the base member 1 and supporting leg. The centrally disposed conduit 4 is fixedly secured to the supporting leg 10 for only a relatively short length and no objectionable stresses or strains are set up.

Each of the outwardly disposed conduit sections 7 and 8 may be secured, by welding or otherwise, to supporting legs 15 formed from suitably sized flange, beam or plate sections which are cut away at their upper portions to receive the curved adjacent sections of the conduits. As illustrated in Fig. 1 the outwardly disposed supporting legs 14 and 15 have their webs disposed transversely across the base member 1 and the center supporting leg 10 has its web portion disposed longitudinally of the base member 1. Either disposition may be used to support the centrally disposed conduit portion or the outwardly disposed conduit portions. The flange sections located at opposite sides of the supporting legs 14 and 15 are preferably recessed or cut away at 16 to minimize the possibility of creating undesirable stresses or strains incident to the welding together of the conduits 7 and 8 and the supporting legs 14 and 15.

The lower portion of each of the supporting legs 14 and 15 is spaced from the web 9 of the base member 1 and is provided with a foot portion 17 shown formed from a suitable flat metal plate. The support legs 14 and 15 are free to move longitudinally within the channel formed by the web 9 and the upwardly extending side flanges 2 and 3 of the base member 1. The channel thus formed provides a guideway for the lower portions of the conduit supporting legs 14 and 15.

Preferably each foot portion or plate member 17 rests upon support bars or members shown at opposite sides of the base member guide channel 6, the support bars preferably being substantially round in cross section. There is thus provided substantially a line contact between the upper edges of the support bars 19 and the underside of the foot portion or plate 17. This construction facilitates movement of the support legs 14 and 15 along the guideway as the conduit portions 7 and 8 shift their positions longitudinally with respect to the base member 1, and also minimizes any possibility of the movable support legs rusting together with the base member 1.

The supporting bars or members 19 may be of commercial cold rolled steel bar stock or, if desired, may be brass or bronze to further facilitate movement of a foot portion 17 therealong.

Preferably a foot portion or portions 17 is retained within the guide channel 6 at all times by inwardly projecting retaining members or bars 20 secured to the base member 1 and extending along the upper surface of the foot member 1 at opposite sides thereof. Thus the bars 19 carry the movable supporting legs 14 and 15, together with the conduits attached thereto, and facilitate movement of the conduits, the retaining bars or members 20 maintain the foot portions 17 in position within the guideway 6, and the upwardly extending flanges or walls of the base member 1 prevent excessive lateral or transverse movement of the conduits 7 and 8, and other conduits connected therewith.

The assembly comprising the base member 1, conduits 4, 7 and 8 with their expansion-contraction accommodating means, the fixed supporting leg 10, and the movable supporting legs 14 and 15 may be prefabricated or assembled in a shop and sent to a particular job as a complete unit for installation as a unit. The complete unit or assemblage may be fixed into position on the building steel work by welding, bolting or otherwise. After the unit has been mounted in position on the building steel work adjacent conduits may be attached by welding or otherwise to the outwardly disposed ends of the movable conduits 7 and 8. The entire unit may be used wherever desired in the power plant, processing plant or the like and may be placed in horizontal, vertical, inclined, or any other suitable position.

In usage, when connected with adjacent lengths or runs of piping, the runs of piping may expand or contract under the influence of heat or cold to move or shift the positions of the outwardly disposed conduit portions 7 and 8. The expansion-contraction accommodating means 5 absorbs the expansion or contraction and the supporting legs 14 and 15 may move longitudinally with the piping along the guideway 6. The guideway 6 formed by the upwardly etxending flanges of the base member 1 retains the piping in position against objectionable or detrimental lateral or transverse movement; the small spaces intermediate the side edges of the support plates 17 and adjacent base member flanges 2 and 3 permit free movement of the plate 17 along the channel 6 and are small enough not to permit excessive lateral movements. The retaining bars 20 retain the feet portions of the movable supporting legs within the channel 6 and the supporting bars 19 facilitate the longitudinal movement of the conduits lengthwise of the base member 1. Thus longitudinal expansion or contraction movements of the pipes or conduits is accommodated, an anchor point is provided for the piping system, and the conduit or piping is retained in position against objectionable lateral movement.

While the base member 1 has been shown and described chiefly as a substantially H-shape cross section it may comprise a substantially U-shaped channel or other suitable form.

In Figs. 4 and 5 there is illustrated a modified movement-facilitating means which may be used with the movable supporting legs 14 or 15. A supporting leg 14a is provided with a foot portion or plate member 17a which rests upon a plurality of rollers 25 that extend transversely across the base member 1a. The end portions of the roller members 25 project outwardly through slots or openings 26 in flanges of the base member 1a and are retained against longitudinal movement out of the recesses 26 by apertured retaining and spacing plates 28 and cotter pins or keys 29. The cotter pins extend through transverse apertures in the rollers 25. The supporting rollers are shown resting upon "tracks" 31 provided by forming the slots 26 at a position spaced slightly from the web 9a; in this manner the rollers 25 are spaced away from the cross web 9a of the base member 1a. If desired the recesses 26 may be formed closer to the cross web 9a so that the roller members 25 rest for substantially their entire lengths against, and roll on, the cross web 9a. Supporting a foot portion 17a on rollers facilitates movement of supporting legs 14a and of conduit portions 7a connected therewith. The construction is not as simple as that of Figs. 1, 2 and 3 but enhanced movement provided may be desired in certain instances. Suitable supporting balls may be utilized in lieu of the rollers 25 illustrated in Figs. 4 and 5. If desired, the side plates 25 may be welded to adjacent flanges.

Movement of the supporting legs 14, 15 and 14a, together with the conduits supported thereby, may be further facilitated by lubricating the bars 19 or rollers 25 with graphite or suitable grease. The various conduits may be covered with some insulating material.

In Fig. 6 there is illustrated a form of the invention comprising a base member 1b generally similar to that of Fig. 1, a fixed support leg 10b secured to a conduit 4b, an expansion-contraction accommodating means 5b, and a single movable support leg 14b to which is welded or secured a conduit 7b. The movable support leg 14b is mounted within a channel to accommodate longitudinal movement of the conduit 7b as previously described. The movement-facilitating means illustrated in Figs. 4 and 5 may be used to support the leg portion 14b of Fig. 6. A unit embodying the construction of Fig. 6 may be utilized in instances which require the use of only a single expansion-contraction accommodating means.

In some instances it may be desired to omit the fixedly secured or anchored support leg 10 and the centrally disposed conduit 4 illustrated in Fig. 1 and to connect conduits to opposite ends of a single expansion-contraction accommodating means 5c (Fig. 7). Such a modified arrangement of the invention is illustrated in Fig. 7 and includes a base or foundation member 1c retaining movable support legs 14c and 15c, the movable support legs being secured to movable conduit portions 7c and 8c. The movable support legs 14c and 15c are movably mounted upon supporting means similar to that already described in connection with Figs. 1, 2 and 3; the support means of Figs. 4 and 5 may be used if desired.

As either of the conduits 7c or 8c expands or contracts longitudinally the supporting legs 14c, 15c may move longitudinally along the guideway provided by the upwardly extending webs of the base member 1c. Suitable supporting bars 19c and retaining means 20c cooperate with the upwardly extending flange portions of the base member 1c to restrain the support legs 14c, 15c and conduits connected therewith against lateral or transverse movement, yet free longitudinal movement of the conduits is permitted.

It will be seen that the present invention provides new and improved combination conduit and retaining means adapted to movably support and guide conduit or piping. The device may be mounted as a complete unit in any desired position in a power plant, processing plant, or the like. Conduit or piping may freely move or "float" longitudinally under the influence of expansion or contraction forces and yet is restrained against objectionable transverse or lateral movement. The conduit is maintained in desired position and cannot objectionably shift or move laterally so as to rupture or fracture the conduits. The device is simple and inexpensive to construct and may be installed as a unit for subsequent ready connection with adjacent lengths of conduit.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination of a base, a plurality of conduits adjacent said base, expansion-contraction accommodating means connecting said conduits, means retaining one of said conduits with the base for longitudinal movement of said conduit, and roller-like means intermediate said latter conduit and the base adapted to facilitate movement of said latter conduit.

2. A device of the class described for maintaining conduits aligned with each other comprising expansion-contraction accommodating means connecting said conduits together, a base, guide means including a flange projecting from said base and extending generally longitudinally of said conduits, a plurality of support means secured to said conduits and supporting them on said base, and one of said support means having a portion lying in close proximity to said flange and being free to move longitudinally along the base and flange during movement of the conduit connected therewith, said flange limiting lateral motion of the latter mentioned conduit and its support means.

3. A device of the class described for maintaining conduits aligned with each other comprising expansion-contraction accommodating means connecting said conduits together, a base, guide means including a flange projecting from said base and extending generally longitudinally of said conduits, a plurality of support means secured to said conduits and supporting them on said base, and each of said support means having a portion lying in close proximity to said flange and being free to move longitudinally along the base and flange during movement of the conduit connected therewith, said flange limiting lateral motion of the conduits and their support means.

4. A device of the class described for maintaining conduits aligned with each other comprising expansion-contraction accommodating means connecting said conduits together, a base, guide means including a flange projecting from said base and extending generally longitudinally of said conduits, a plurality of support means secured to said conduits and supporting them on said base, at least one of said support means being fixedly positioned with respect to said base and flange, and at least one of said support means having a portion lying in close proximity to said flange and being free to move longitudinally along the base and flange during movement of the conduit connected therewith, said flange limiting lateral motion of the latter mentioned conduit and its support means.

5. A device of the class described for maintaining conduits aligned with each other comprising expansion-contraction accommodating means connecting said conduits together, a base, guide means including a flange projecting from said base and extending generally longitudinally of said conduits, a plurality of support means secured to said conduits and supporting them on said base, at least one of said support means having a portion lying in close proximity to said flange and being free to move longitudinally along the base and flange during movement of the conduit connected therewith, said flange limiting lateral motion of the latter mentioned conduit and its support means, and means for holding the movable support means out of contact with said base to thereby facilitate movement longitudinally along the base.

6. A device of the class described for maintaining conduits in alignment with each other comprising, a channel-like base having a central portion from which project spaced guide flanges, a plurality of conduits supported by said base and having adjacent end portions spaced longitudinally from each other, an expansion-contraction bellows connecting together adjacent portions of said conduits, separate support means secured to each of said conduits and supporting them on said base, and at least one of said support means being movable to and fro along said base intermediate the guide flanges with expansion and contraction movement of the conduit that is connected therewith, said guide flanges limiting the extent of lateral motion of the latter mentioned conduit during said movement.

7. A device of the class described for maintaining conduits in alignment with each other comprising, a channel-like base having a central portion from which project spaced guide flanges, a plurality of conduits supported by said base and having adjacent end portions spaced longitudinally from each other, an expansion-contraction bellows connecting together adjacent portions of said conduits, separate support means secured to each of said conduits and supporting them on said base, at least one of said conduits being fixedly positioned with respect to said guide flanges, and at least one of said support means being movable to and fro along said base intermediate the guide flanges with expansion and contraction movement of the conduit that is connected therewith, said guide flanges limiting the extent of lateral motion of the latter mentioned conduit during said movement.

8. A device of the class described for maintaining conduits in alignment with each other comprising, a channel-like base having a central portion from which project spaced guide flanges, a plurality of conduits supported by said base and having adjacent end portions spaced longitudinally from each other, an expansion-contraction bellows connecting together adjacent portions of said conduits, separate support means secured to each of said conduits and supporting them on said base, at least one of said support means being movable to and fro along said base intermediate the guide flanges with expansion and contraction movement of the conduit that is connected therewith, said guide flanges limiting the extent of lateral motion of the latter mentioned conduit during said movement, and means intermediate said central portion of the base and the movable support means for holding the latter means out of contact with said central portion to thereby facilitate to and fro movement of the support means.

9. A device of the class described for maintaining conduits aligned with each other comprising expansion-contraction bellows connecting said conduits together, a base, guide means including a flange projecting from said base and extending generally longitudinally of said conduits, a plurality of support means secured to said conduits, one of said support means having a portion lying in close proximity to said flange and being free to move longitudinally along the base and flange during movement of the conduit connected therewith, and means for retaining said portion in said close proximity to the flange, said flange limiting lateral motion of the latter mentioned conduit and its support means.

WALTER A. SHERBROOKE.

REFERENCES CITED

The following references are of record in the file of this patent:

UNITED STATES PATENTS

| Number | Name | Date |
|---|---|---|
| 1,739,057 | Bock | Dec. 10, 1929 |
| 1,872,089 | McKee | Aug. 16, 1932 |
| 2,285,632 | Urbain | June 9, 1942 |
| 2,335,478 | Bergman | Nov. 30, 1943 |
| 2,337,038 | Fentress | Dec. 21, 1943 |
| 2,373,439 | Wheatley | Apr. 10, 1945 |